July 25, 1967          A. C. WOODEN          3,333,242
DEVICE FOR INDICATING LOSS OF AIR PRESSURE IN A TIRE
Filed Oct. 2, 1964
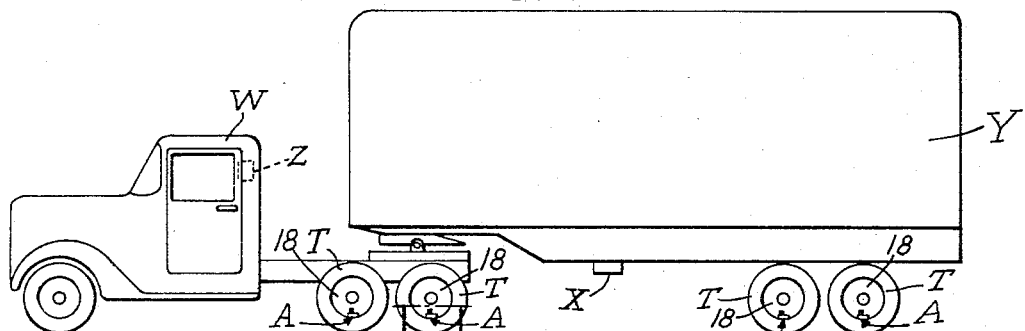
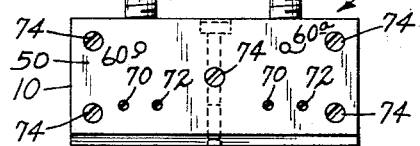
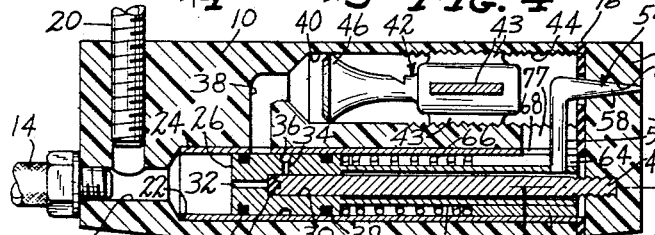
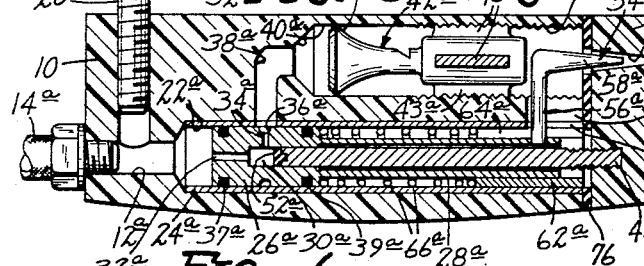
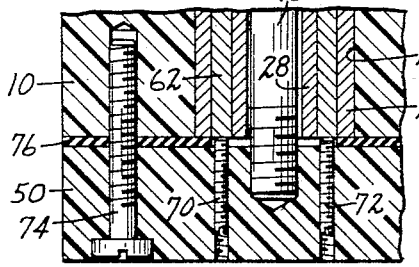
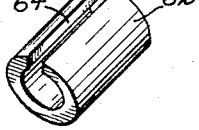
INVENTOR.
ANDREW C. WOODEN
BY
Caswell, Lagaard & Hicks
ATTORNEYS

United States Patent Office 3,333,242
Patented July 25, 1967

3,333,242
DEVICE FOR INDICATING LOSS OF AIR PRESSURE IN A TIRE
Andrew C. Wooden, Box 237, Little Falls, Minn. 56345
Filed Oct. 2, 1964, Ser. No. 401,116
7 Claims. (Cl. 340—58)

ABSTRACT OF THE DISCLOSURE

The invention includes a body member having a cylinder with an air inlet leading to the cylinder. The air inlet is connected to the valve stem of a pneumatic tire and an air outlet leads from the cylinder. An air actuated sound emitting device is located in the air outlet. A piston is mounted within the cylinder and means are provided for introducing air into the air inlet to actuate the piston and inflate the tire through the connection of the air inlet and the valve stem. The piston is formed with a passageway to allow air to pass through the piston from the air inlet to the air outlet and activate the sound device.

The passageway of the piston is positioned so that air cannot pass through said air inlet therethrough when a predetermined air pressure exists in the cylinder and air inlet. The air outlet passageway is closed by means carried by the piston when the piston is in a predetermined position. A signal receiver and transmitter is provided for attachment to the vehicle and tuned to receive a signal from the sound emitting device and transmit the sound to a receiver in the cab of the vehicle on which vehicle the body member is mounted.

---

The present invention relates to an improvement in a device for indicating a loss of air pressure in a pneumatic tire.

As the size of vehicles for overland transportation such as busses and trucks increased, the size and quality of the pneumatic tires used therewith also increased and the cost of the same increased considerably. When a pneumatic tire is run with the pressure below normal, excessive wear is caused. Also, if the tire pressure falls to nothing, further running completely destroys the tire.

It is an object of the invention to provide a device mounted on the wheel of the vehicle for indicating a fall off in pressure in a tire, the loss in pressure actuating a high frequency inaudible sound device which emits an acoustic signal picked up by a receiver-transmitter tuned to the acoustic signal and located, for example, on a semi-trailer centrally of the rear wheels of the trailer and the rear wheels of the tractor carrying the device, the receiver-transmitter having a transducer or other conventional means for converting the phonic signal to a radio signal. The radio signal produced is transmitted to a receiver in the cab of the vehicle thereby warning the driver.

With the use of a high frequency sound inaudible to the human ear many other ever-present background sounds are not received by the receiver-transmitter to thereby give a false warning. In addition, the receiver of the receiver-transmitter has a low sensitivity sufficient only to pick up an acoustical signal from a sound emitting unit and therefore other high frequency extraneous sounds are ignored. The low sensitivity of the receiver is made possible by the receiver-transmitter located centrally of the sound emitting units and thus located a minimum distance from any one of the sound units. With this minimum distance extraneous high frequency sounds are not picked up which would be the case where the receiver was located solely in the cab of the tractor-trailer example above-mentioned with the distance from the cab to the rear wheel of the trailer greatly increased over the use of a receiver-transmitter as outlined above.

When the driver in the cab receives the warning signal, he can stop the vehicle and ascertain by visual inspection or tapping of the tires which tire has lost air pressure.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

FIGURE 1 is a side elevation of a truck tractor and semi-trailer illustrating the device thereon.

FIGURE 2 is a perspective view of that portion of the unit mounted on the wheel of the vehicle.

FIGURE 3 is a rear end view of the wheel unit.

FIGURE 4 is a section on the line 4—4 of FIGURE 3 with the unit shown in non-operating condition.

FIGURE 5 is a section on the line 5—5 of FIGURE 3 with the unit shown in sound-emitting operating condition.

FIGURE 6 is a section on the line 6—6 of FIGURE 4.

FIGURE 7 is a perspective view of a collar removed from the unit used in adjusting the resistance of the piston to air pressure.

FIGURE 8 is a view on the line 8—8 of FIGURE 1 showing the installation of the unit on the wheel of the vehicle.

FIGURE 9 is a perspective view of the piston and extension thereof removed from the device.

Referring to the drawings in detail, the wheel unit A, as part of the device for indicating loss of tire pressure, includes the body member 10 made of high impact plastic. Formed in the body 10 is the air inlet orifice 12 to which is connected the short air line 14 which is also connected to the conventional valve stem 16 of the curbside wheel rim 18, the valve core having been removed. Mounted in the body 10 and leading to the air inlet orifice 12 is the inflating stem 20 in which is mounted the valve core not shown, and leading from and axial with the air inlet orifice 12 is the enlarged cylinder portion 22 in which is positioned the metal cylinder sleeve 24.

Positioned in the cylinder sleeve 24 is the piston 26 formed with the axial tubular extension portion 28 which extends from the axial recess 30 formed within the piston. The numeral 32 designates an axial air passageway leading from the top of the piston to the axial recess 30. Leading radially from the recess 30 and outwardly of the piston is the air passageway 34 which terminates at the annular air vent 36 formed in the wall of the piston. The axial air passageway 32 together with the passageway 34 and annular air vent 36 form an air transfer passageway to transfer air from the top of piston 26 to outlet passageway 38. The outlet passageway 38 leads from the cylinder sleeve 24 to the sound chamber 40 in which is positioned the sound emitter member 42. The chamber 40 overlies the cylinder 24. The sound emitter 42 when actuated by air pressure gives off a high frequency sound inaudible to the human ear. Sealing engagement of the piston with the cylinder 24 on both sides of the annular air vent is made by means of the O-rings 37 and 39 carried by the piston.

The sound emitter member 42 is mounted axially within the sound chamber 40 by means of four web portions 42 having threaded formations on the edges thereof engaged with the threads 44 formed on the inner surface of the chamber 40. The sound emitter 42 is formed with the flared mouth portion 46, the annular edge of which is in contact with the wall surface of the chamber 40 whereby air is directed into the mouth portion 46. The chamber 40 extends to the rear end of the body 10.

The numeral 48 designates a fixed support rod which is threadedly engaged at its rear end to the body closure plate 50 forming part of the body 10 and this rod extends through the tubular piston extension 28 and into the axial recess 30 of piston 26. The inner end of the support rod 48 has formed thereon the sealing tip 52 which seals off the rear end of the axial passageway 32 when the piston 26 is in a position with the annular air vent 38 out of register with outlet passageway 38 due to sufficient air pressure received from the tire to which the device is connected, as illustrated, particularly in FIGURE 4.

Further provided is the sound chamber closure member 54 which includes the vertical leg portion 56 secured at its lower end to the piston extension 28 by press fitting the same into a hole in the extension 28 after the piston and extension 28 is placed in the cylinder 24. The closure member 54 also includes the horizontal leg portion 58 in the form of a closure needle which closes off the valve seat 60 formed in the rear closure plate 50 when the piston is in a position as the result of sufficient air pressure in the tire to which the device is connected.

The numeral 62 designates a collar having a slot 64 extending throughout the wall thereof. The collar 62 is positioned within the cylinder 24 with the leg portion 56 of the closure member 54 extending through the slot 64. Positioned between the inner end of the collar 62 and the inner end of the piston 26 is the coil spring 66 normally urging the piston 26 toward the inlet hole 12 against the air pressure introduced from the tire as hereinafter described. The cylinder sleeve 24 has a slot 68 formed in the rear end thereof to allow movement of the closure member 54.

The tension of spring 66 is predetermined at various degrees of compression and is varied by means of the adjusting screws 70 and 72 threadedly engaged in the rear closure plate 50 with the inner ends thereof in contact with the outer end of the collar 62. As the adjusting screws 70 and 72 are screwed inwardly of the plate 50, the same move the collar inwardly against the spring 66 thereby urging the piston with greater force towards inlet 12. The tension on the spring is varied to compensate for different size tires and pressures. The closure plate 50 is secured to the body 10 by means of the bolts 74 with the sealing gasket 76 interposed therebetween. The casing body 10 is formed with the internal recess 77 which communicates with both the sleeve 24 and the chamber 40 so as to allow movement of closure member 54. The body 10 is secured to the rim of a wheel by means of the bolts 82 extending therethrough.

The use and operation of the device is as follows:

Air pressure is introduced into the tire T by means of the inflating stem 20 of the body 10 via the short air line 14 to the tire valve stem 16. The air pressure created forces the piston 26 against the pressure of the spring 66 to a point where the annular air vent is positioned so that it is not in alignment with the outlet passageway 38. The tension of the spring 66 is such that it takes, for example, 110 lbs. of air pressure to maintain the piston 26 in the position shown in FIGURE 4. The spring 66 is constructed so that when the air pressure in the tire T falls off to say 90 lbs., the piston moves to the position shown in FIGURE 5 whereby the annular air vent 36 is opposite the air outlet passageway 38 thereby causing air to enter the sound emitter 42 and create a high frequency acoustic signal. The frequency of the sound emitter 42 is approximately 20,000 c.p.s. and up.

As the piston 26 moves to the position shown in FIGURE 5, the needle portion 58 of closure 54 is removed from the valve seat 60 whereby the acoustic signal made by the emitter 42 escapes from the body 10 out the valve seat 60. This inaudible acoustic signal is picked up by a conventional receiver-transmitter X positioned on the semi-trailer Y centrally of the rear tractor wheels and wheels of the trailer.

The receiver-transmitter X includes a transducer for converting the acoustic signal to the radio signal. The radio signal transmitted by X is received by the receiver Z in the cab of the tractor W. With the receiver-transmitter X located on the semi-trailer and centrally of the same, the receiver of the receiver-transmitter X is of a low sensitivity thus not picking up extraneous acoustic signals. The signal warns the driver in the cab that a tire has less than a minimum air pressure which may be repaired before damaged. When the tire is repaired or replaced, the same is inflated and the piston 26 thereby returned to the position shown in FIGURE 4 with full tire pressure. With the use of a high frequency inaudible sound emitter signal of low-signal strength, and the receiver-transmitter tuned to pick up only such sound, other extraneous sounds will not be picked up by the receiver-transmitter X and thus give a false warning signal. Also a signal from a similar sound emitter on a passing vehicle will not be picked up by X.

The body 10 houses the piston 26, the action of which causes a warning signal upon a fall in air pressure in tire T on the wheel 18 as one of a pair of dual wheels. A fall off of air pressure in the other tire TT of the dual wheel 19 is indicated by means of identical construction in the same body 10, the body 10 being mounted on the rim of the outboard dual rim 18. The identical parts are given identical numbers accompanied in each instance by the letter $a$. Short air line 14$a$ is connected to the valve stem 80 of the tire TT, the valve core being removed from stem 80 and placed in inflating stem 20$a$. Thus, the unit A serves both tires T and TT. A unit A is used for each set of dual wheels. A sound emitted by any of the units A of FIGURE 1, for example, is picked up and transmitted by the receiver-transmitter X. The driver ascertains by a simple visual check or tapping of the tires which tire has reduced air pressure.

The invention is not to be understood as restricted to the details set forth since these may be modified within the scope of the appended claims without departing from the spirit and scope of the invention.

Having thus described the invention what is claimed as new and desired to be secured by Letters Patent is:

1. A device for indicating loss of air pressure in a tire comprising:
   (a) a body member,
   (b) an air inlet orifice formed in said body member and leading to
   (c) a cylinder formed therein,
   (d) means for connecting said air inlet orifice to the valve stem of a tire,
   (e) a piston mounted in said cylinder,
   (f) means for introducing air into said air inlet orifice to actuate said piston and inflate a tire through said connecting means,
   (g) spring means for urging said piston towards said air inlet orifice,
   (h) said piston having an air passageway formed therein and leading to
   (i) an annular air vent formed on the surface of said piston,
   (j) said body member having an air outlet passageway formed therein,
   (k) an air-actuated sounding device mounted in said air outlet passageway,
   (l) said air outlet passageway terminating in a sound emitting hole formed in said body, (m) means connected to said piston for opening said sound emitting hole when said piston is moved due to a reduction in pressure thereon and the action of said spring to a position with said annular air vent opposite said air outlet passageway, air pressure thereby passing into said outlet passageway through said sounding device to activate the same and cause sound from said sounding device to emit from said sound emitting hole, said sound emitting hole opening means closing said sound emitting hole when said piston is moved by increased air pressure thereon with said annular air vent placed out of register with said air outlet passageway to deactivate said sounding device.

2. A device for indicating loss of air pressure in a tire comprising:
  (a) a body member having
  (b) a cylinder formed therein,
  (c) air inlet means formed in said body and leading to said cylinder,
  (d) means for connecting said air inlet means to the valve stem of a tire,
  (e) air outlet means formed in said body and leading from said cylinder outwardly of said body,
  (f) a piston positioned in said cylinder,
  (g) means for introducing air into said air inlet means to actuate said piston and inflate a tire through said connecting means,
  (h) said piston having an air transfer passageway,
  (i) an air actuated sound device mounted in said air outlet means,
  (j) means urging said piston to place said air transfer passageway in register with said air outlet means to activate said sounding device when air pressure upon said piston is reduced to a predetermined amount,
  (k) said piston held in a position in said cylinder by a predetermined air pressure whereby said air transfer passageway is out of register with said air outlet means thereby deactivating said sounding device.

3. A device for indicating loss of air pressure in a tire comprising:
  (a) a body member having
  (b) a cylinder formed therein
  (c) a piston mounted in said cylinder,
  (d) an air inlet orifice leading to said cylinder and
  (e) an air outlet passageway leading from said cylinder and out of said body member,
  (f) means for connecting said air inlet means to the valve stem of a tire,
  (g) an air actuated sound emitting device mounted in said air outlet passageway,
  (h) means for introducing air into said air inlet orifice to actuate said piston and inflate a tire through said connecting means,
  (i) means carried by said piston for allowing air to pass therethrough from said air inlet orifice to said air outlet pasageway to activate said sound device,
  (j) means carried by said piston for preventing air from passing through said piston from said inlet orifice to said outlet passageway to deactivate said sound device,
  (k) means for opening the outer end of said outlet passageway to allow sound to escape from said sound device when air is allowed to pass to said outlet passageway and
  (l) means for closing the outer end of said outlet passageway when air is prevented from passing through said piston to said outlet passageway.

4. A device for indicating loss of air pressure in a tire comprising in combination:
  (a) a body member having
  (b) a cylinder formed therein
  (c) a piston positioned in said cylinder,
  (d) an air inlet orifice leading to said cylinder and
  (e) an air outlet passageway leading from said cylinder and out of said body member,
  (f) means for connecting said air inlet orifice to the valve stem of a tire,
  (g) an air actuated sound emitting device mounted in said air outlet passageway,
  (h) means for introducing air into said air inlet orifice to actuate said piston and inflate a tire through said connecting means,
  (i) means carried by said piston for allowing air to pass therethrough from said air inlet orifice to said air outlet passageway to activate said sound device,
  (j) means carried by said piston for preventing air from passing through said piston from said inlet orifice to said outlet passageway to deactivate said sound device,
  (k) means for opening the outer end of said outlet passageway to allow sound to escape from said sound device when air is allowed to pass to said outlet passageway and
  (l) means for closing the outer end of said outlet passageway when air is prevented from passing through said piston to said outlet passageway,
  (m) a signal receiver and transmitter for location on a vehicle on which said body member is located and tuned to receive a signal from said sound emitting device and transmitting the same,
  (n) a receiver for location in the cab of the vehicle for receiving the signal transmitted from said signal receiver and transmitter.

5. A device for indicating loss of air pressure in a tire comprising:
  (a) a body member having
  (b) a cylinder formed therein,
  (c) air inlet means formed in said body and leading to said cylinder,
  (d) means for connecting said air inlet means to the valve stem of a tire,
  (e) air outlet means formed in said body and leading from said cylinder outwardly of said body,
  (f) a piston positioned in said cylinder,
  (g) means for introducing air into said air inlet means to actuate said piston and inflate a tire through said connecting means,
  (h) said piston having an air transfer passageway,
  (i) an air actuated sound device mounted in said air outlet means,
  (j) means urging said piston to place said air transfer passageway in register with said air outlet means to activate said sounding device when air pressure upon said piston is reduced to a predetermined amount,
  (k) said piston held in a position in said cylinder by a predetermined air pressure whereby said air transfer passageway is out of register with said air outlet means thereby deactivating said sounding device, and
  (l) means for adjusting said piston urging means to increase or decrease the resistance of said piston to the air pressure exerted thereon.

6. A device for indicating loss of air pressure in a tire comprising:
  (a) a body member having
  (b) a sound emitting device positioned therein,
  (c) an air inlet formed in said body member and leading to
  (d) a cylinder formed therein,
  (e) means for connecting said air inlet to the valve stem of a tire,
  (f) valve means for admitting air pressure into said air inlet to inflate a tire through said connecting means and create pressure on said piston,
  (g) means for urging said piston against the action of air pressure thereon,
  (h) said body member having an air passageway leading from said cylinder to said sound device, (i) means carried by said piston for admitting air pressure to said sound emitting device to actuate the same upon a lowering of pressure in said cylinder upon said piston, (j) means carried by said piston for preventing air pressure from passing from said cylinder to said sound emitting device upon a predetermined air pressure exerted on said piston and (k) means for mounting said body member on the wheel rim of a vehicle.

7. A device for indicating loss of air pressure in a tire comprising:

(a) a body member, (b) an air inlet orifice formed in said body member and leading to (c) a cylinder formed therein, (d) means for connecting said air inlet orifice to the valve stem of a tire, (e) a piston mounted in said cylinder and having (f) an axial air passageway extending from the top of said piston into said piston and terminating in an axial recess therein, (g) said piston having a tubular member extending therefrom and in communication with said axial recess, (h) said piston having an air passageway extending radially from said axial passageway and terminating in (i) an annular air vent formed in the wall of said piston, (j) a fixed support rod connected at the outer end thereof to said body and extending into said tubular member and said axial recess of said piston, (k) said body member having an air outlet passageway formed therein, (l) an air-actuated sounding device mounted in said air outlet passageway, (m) said air outlet passageway terminating in a sound emitting hole formed in said body, (n) a closure member for said sound emitting hole carried by said tubular member, (o) spring means for urging said piston towards said air inlet orifice upon a decrease in air pressure on said piston to allow said annular air vent to align with said air outlet passageway and cause air to pass through said sounding device and activate the same, said closure member moving with said piston to open said sound emitting hole, said piston moving against said spring upon an increase in pressure upon said piston thereby moving said annular air vent of said piston out of register with said air outlet passageway thereby deactivating said sounding device and placing the inner end of said support rod in sealing contact with the bottom of said axial recess thereby sealing off said axial air passageway of said piston.

References Cited

UNITED STATES PATENTS

| | | | |
|---|---|---|---|
| 960,246 | 6/1910 | Ashmore | 340—58 |
| 2,709,983 | 6/1955 | Divietro | 116—34 |
| 3,192,516 | 6/1965 | Simpkins et al. | |

NEIL C. READ, *Primary Examiner.*

A. H. WARING, *Assistant Examiner.*